(12) United States Patent
Eda (10) Patent No.: US 6,212,838 B1
(45) Date of Patent: Apr. 10, 2001

(54) FLOOR MATERIAL AND FLOORING USING THE FLOOR MATERIAL

(75) Inventor: Noboru Eda, Saitama (JP)

(73) Assignee: Kabushikikaisha Edagumi, Saitama (JP)

( * ) Notice: Subject to any disclaimer, the term of this patent is extended or adjusted under 35 U.S.C. 154(b) by 0 days.

(21) Appl. No.: 09/162,285

(22) Filed: Sep. 29, 1998

(30) Foreign Application Priority Data

Sep. 29, 1997 (JP) .................................................. 9-263650

(51) Int. Cl.⁷ .................................................. E04F 15/22
(52) U.S. Cl. ..................... 52/403.1; 428/218; 428/455
(58) Field of Search ........................ 52/403.1; 428/218, 428/455, 534, 535

(56) References Cited

U.S. PATENT DOCUMENTS

| 1,134,578 | * | 4/1915 | Armstrong | 52/403.1 |
|---|---|---|---|---|
| 1,292,705 | * | 1/1919 | Cheney | 428/455 |
| 1,484,200 | * | 2/1924 | Vincke | 428/455 |
| 1,642,845 | * | 9/1927 | Duke | 428/455 |
| 1,762,138 | * | 6/1930 | Grupe | 428/455 |
| 2,147,987 | * | 2/1939 | Mueller | 428/455 |
| 2,828,219 | * | 3/1958 | Heiges et al. | 428/455 |
| 3,308,009 | * | 3/1967 | Baumgartner, Jr. | 428/455 |
| 3,573,154 | * | 3/1971 | Tank | 428/455 |
| 3,975,562 | * | 8/1976 | Madebach et al. | 428/455 |
| 4,684,562 | * | 8/1987 | Hartkemeyer | 428/455 |
| 5,103,614 | * | 4/1992 | Kawaguchi et al. | 52/403.1 |
| 5,718,968 | * | 2/1998 | Cutler et al. | 428/455 |

FOREIGN PATENT DOCUMENTS

| 446322 | * | 9/1912 | (FR) | 428/455 |
|---|---|---|---|---|
| 2 535 247 | | 5/1984 | (FR) | B32B/21/08 |
| 2535247 | * | 5/1984 | (FR) | 428/455 |
| 2 672 961 | | 8/1992 | (FR) | F16L/59/02 |
| 2 108 426 | | 5/1983 | (GB) | B32B/21/02 |

* cited by examiner

Primary Examiner—Carl D. Friedman
Assistant Examiner—Dennis L. Dorsey
(74) Attorney, Agent, or Firm—Ronald P. Kananen; Rader, Fishman & Grauer (57) ABSTRACT

The present invention provides a floor material and a flooring method which satisfy the various functions required of a floor while reducing the building costs and construction term.

The floor material consists of a surface decorative member 2 formed from a material to have a high density and constituting a floor surface layer; an intermediate cork member 3 formed from a cork material to have a slightly lower density than the surface decorative member 2 and constituting a floor intermediate layer; and a substrate cork member 4 made from a carbonated cork material to have a slightly lower density than the intermediate cork member 3 and constituting a floor substrate layer. The substrate cork member 4 is bonded on a backing material 10 of a building, onto which the intermediate cork member 3 and the surface decorative member 2 are successively bonded so as to obtain a three-layered floor mainly consisting of a cork material.

6 Claims, 8 Drawing Sheets

○──○ : SHOCK SOUND LEVEL ON FINISHED FLOOR
◇──◇ : SHOCK SOUND LEVEL ON RC SLAB
△──△ : FLOOR SHOCK SOUND LEVEL IMPROVEMENT

FIG.6A

| FLOOR SHOCK SOUND GENERATOR | LIGHT WEIGHT SHOCK SOUND GENERATOR | | | | | | |
|---|---|---|---|---|---|---|---|
| 1 OCTAVE BAND, CENTER FREQUENCY, Hz | 63 | 125 | 250 | 500 | 1000 | 2000 | 4000 |
| SHOCK SOUND LEVEL ON RC SLAB, dB | 67 | 72 | 74 | 73 | 72 | 73 | 71 |
| SHOCK SOUND LEVEL ON FINISHED FLOOR, dB | 65 | 65 | 62 | 44 | 27 | — | — |
| FLOOR SHOCK SOUND LEVEL IMPROVEMENT, dB | 2 | 7 | 12 | 29 | 45 | — | — |
| REVERBERATION TIME, s | 2.32 | 1.61 | 1.39 | 1.24 | 1.29 | 1.41 | 1.26 |

| FLOOR SHOCK SOUND GENERATOR | HEAVY WEIGHT SHOCK SOUND GENERATOR | | | | | | |
|---|---|---|---|---|---|---|---|
| 1 OCTAVE BAND, CENTER FREQUENCY, Hz | 63 | 125 | 250 | 500 | 1000 | 2000 | 4000 |
| SHOCK SOUND LEVEL ON RC SLAB, dB | 79 | 63 | 60 | 48 | 40 | 37 | 34 |
| SHOCK SOUND LEVEL ON FINISHED FLOOR, dB | 79 | 62 | 57 | 48 | 35 | 22 | 17 |
| FLOOR SHOCK SOUND LEVEL IMPROVEMENT, dB | 0 | 1 | 3 | 0 | 5 | 15 | 17 |
| REVERBERATION TIME, s | 2.32 | 1.61 | 1.39 | 1.24 | 1.29 | 1.41 | 1.26 |

FLOOR MATERIAL AND FLOORING USING THE FLOOR MATERIAL

BACKGROUND OF THE INVENTION

1. Field of the Invention

The present invention relates to a flooring material and in particular, to a flooring material mainly consisting of cork, and a flooring method.

2. Description of the Prior Art

A flooring material is one of the most important factors for creating a comfortable dwelling space not only in an individual house but also in a multiple dwelling house. Conventionally, various flooring materials and various flooring methods have been employed. Flooring materials are required to have various superior functions such as in safety in case of fall down, sound shielding/absorption, easiness of walking and caster-running, restoring ability, prevention of fire spreading, heat insulation characteristic, water-proof and chemicals-proof characteristics as well as insect-proof and mildew proof characteristics. The safety in case of fall down means a function to mitigate a shock applied when something falls down, preventing from a disaster, as well as to reduce the injury degree when a person falls down. This safety in case of fall down has become particularly important in the era when the number of aged people is increasing.

The sound shielding. absorption characteristic means a function to reduce a sound volume at a down floor below located below a sound source and absorb a sound reflected within a room. The sound shielding/absorption characteristic also is an important requirement not to cause a noise trouble, especially between neighboring apartments in a multiple dwelling house. The easiness of walking means a function to satisfy an overall evaluation such as not to cause a fatigue feeling and give an appropriate temperature feeling and smoothness or sliding feeling. The easiness of caster running is an evaluation function which evaluates smoothness when moving an object in a room such as a wheel chair and a bed having casters which are more and more often used for an aged person in a house.

The restoring ability means an ability to restore to an initial state after a heavy object is removed, or a restoring ability of a convex formed when a heavy object is fallen down. The fire spread prevention means a function that the material itself is hard to burn. The heat insulation means a heat insulation function or heat maintenance function which increases the cooling and warming effects, suppressing energy consumption. The water and chemical resistance mean that water cannot easily penetrate the flooring material which is not easily affected by chemicals. Furthermore, insect and mildew resistance means a function that reduces living of vermin such as termites and reduces condensation.

Conventionally, tatami (straw mattress) and carpets have been used as the flooring material and there can also be seen popularity of wooden flooring among younger generations. Table 1 below shows the function characteristics of the flooring material according to the present invention in comparison to the tatami, carpet, and the wooden flooring.

TABLE 1

| Functions | Tatami | Carpet | Conventional Flooring | Floor Material according to the present invention |
|---|---|---|---|---|
| Safety in case of fall down | Excellent | Good | Bad | Excellent |
| Sound Shielding and absorption | Good | Good | Bad | Good |
| Walking feeling | Good | Good | Allowable | Good |
| Caster running | Bad | Bad | Excellent | Good |
| Restoring ability | Allowable | Good | Good | Allowable |
| Fire spread prevention | Bad | Bad | Bad | Excellent |
| Heat insulation | Excellent | Good | Bad | Excellent |
| Water-proof, chemicals-proof | Bad | Bad | Allowable | Good |
| Insect-proof, Mildew-proof | Bad | Bad | Good | Good |

As is clear from the table above, for example, the tatami shows superior characteristics in safety and heat insulation but has a problem for caster running, fire spread prevention, water and chemical resistance as well as insect-resistance and mildew resistance. Moreover, the carpet has a problem in caster running, fire spread prevention, water and chemical resistance and in insect and mildew resistance. Furthermore, the wooden flooring, although showing a superior characteristic in caster running, restoring ability and insect and mildew resistance, has problems in the other aspects. Thus, the tatami and the carpet or the wooden flooring which have been widely used cannot be evaluated as ideal flooring materials.

In a multiple dwelling house, sound shielding and absorption are quite important between upper and lower floors. In order to obtain a sufficient sound shielding characteristic, it is necessary to use a concrete slab having a sufficient thickness. For example, even when a high-efficiency wooden flooring is employed, the slab thickness should be at least 180 mm or above in order to obtain the necessary sound shielding class $L_H$ (Heavy load shock sound shielding class)=50 and $L_L$ (Light load shock sound shielding class)=50.

A multiple dwelling house using such thick concrete slabs require more building materials such as concrete and reinforcing steel and as a result, requires more building materials to sustain strength when the entire weight is increased. Consequently, there is a problem that a multiple dwelling house increases building costs and a period of time required for building. Moreover, as the concrete slab increases its thickness, a ceiling height in a room is more limited.

Conventionally, the main building material has been wood, but nowadays when protection of the woods resource has become one of the ecology slogans, it is necessary to develop a new material which suppresses woods destruction. The applicant of the present invention has examined various materials in search of an ideal flooring material, paid attention to a cork material made from a cork oak tree which can be supplied at a stable rate without destroying woods, and developed a product from the cork which satisfies the aforementioned flooring material conditions.

The cork material which is porous and light in weight, and has elasticity, non-penetration characteristic, and low thermal conductivity, is widely known as a cork stopper of a wine bottle and has various applications in various fields. As a building material, the cork exhibits a warm wooden feeling as an interior design product and superior characteristics in sound shielding and thermal insulation. Consequently, the cork is employed not only as an interior product but also as an adjusting material of expansion and contraction of a concrete building, a friction reducing material, a vibration suppressing material, and the like.

However, the cork material is scarcely used in a main portion of a building such as a wall and a floor but normally used as the aforementioned auxiliary building materials or a decorative as a part of a wall. This is because the cork tiles are comparatively expensive; it is difficult to accurately align the cork tiles; and there is an incorrect recognition that the cork is mechanically weak and is easily broken as can be seen in a cork stopper of a bottle or the cork has low water-resistance.

SUMMARY OF THE INVENTION

It is therefore an object of the present invention to provide an ideal flooring material by applying the aforementioned superior characteristics of the cork material so as to sufficiently satisfy the function requirements, and a flooring method using this flooring material enabling a cost reduction as well as reduction in a building period of time.

In order to achieve the aforementioned object, the floor material according to the present invention includes at least: a surface decorative member formed to have a high density and constituting a floor surface layer; an intermediate cork member formed from a cork material to have a slightly lower density than the surface decorative member and constituting a floor intermediate layer; and a substrate cork member formed from a carbonated cork material to have a slightly lower density than the intermediate cork member and constituting a floor substrate layer. In this floor material, the surface decorative ember has a density of 500 kg/m$^3$ or above; the intermediate cork member has a density of 150 kg/m$^3$ or above but below 500 kg/m$^3$; and the substrate cork member has a density below 320 kg/m$^3$.

The surface cork member is made from a dried bark of a cork oak tree crushed into granules and mixed with a synthetic resin, which is shaped into a block body by a mold and cut into a tile shape. The intermediate cork member is made from a cork oak tree crushed into granules and mixed with an adhesive, and the obtained mixture is pressed into a sheet shape. The substrate cork member is made from a mixture of granular cork oak and a powered cork oak which is heated while being pressurized and formed into a block-shaped carbonated cork material which is cut into a panel shape. In this floor material, at least two of the surface decorative member, the intermediate cork member, and the substrate cork member are formed into a unitary layered board.

According to the floor material having the aforementioned configuration according to the present invention, the substrate cork member is bonded onto a backing material of a building such as a concrete slab or floor plate, and onto this substrate cork member are successively bonded the intermediate cork member and the surface decorative member in this order, so as to obtain a three-layered floor plane. This floor material, because of the cork member characteristics, has superior sound shielding and absorption characteristic, heat insulation, water-proof, chemicals-proof, insect-proof, mildew-proof, and other necessary functions. The surface decorative member constituting the surface layer and having a high density and sufficient strength enables to assure functions of comfortable and safe walkability and caster running. In this floor material, the intermediate cork member having a necessary mechanical strength or elasticity enables to prevent destruction of the substrate layer by dispersing a load when a heavy object is placed on the floor as well as assures the restoring function. In this floor material, the substrate cork member having a sufficient elasticity assures the safety function in case of fall down as well as the heat insulation function. The floor material as a whole has a sufficient sound shielding characteristic and is light in weight, it is possible to reduce a thickness of the backing slab, for example, reducing the building material such as concrete and reinforcing steel, which in turn significantly reduces building costs and the building term as well as enables to build a multiple dwelling house with a high ceiling and a superior sound shielding characteristic. Moreover, this floor material, because of its superior heat insulation, enables to increase the effect of cooling and warming facility, offering cool feeling during a summer season and warm feeling during a winter season.

The flooring method according to the present invention which achieves the aforementioned object includes: a substrate cork member bonding step for constituting a floor substrate layer by bonding onto a backing material of a building a substrate cork member formed from a carbonated cork material so as to have a comparatively low density; an intermediate cork member bonding step for constituting an intermediate floor layer by bonding onto the substrate cork member an intermediate cork member formed so as to have a comparatively high density; and a surface decorative member bonding step for constituting a floor surface layer by bonding on the intermediate cork member a surface decorative member formed so as to have a high density, thus obtaining a three-layered floor plane.

Moreover, in the flooring method, the surface decorative member bonding step employs the surface decorative member formed into a tile shape; the intermediate cork member bonding step employs the intermediate cork member formed into a sheet shape; and the substrate cork member bonding step employs the substrate cork member formed into a panel shape. Furthermore, at least two of the surface decorative member, the intermediate cork member, and the substrate member are formed in a unitary layered board. This layered board is bonded to the other member and/or the backing of the building so as to obtain a three-layered floor plane.

The flooring method according to the present invention enables to easily obtain in a short period of time a three-layered floor plane mainly consists of a cork member, which enables to obtain various necessary functions such as a superior sound shielding and absorption characteristic, heat insulation characteristic, water-proof, chemicals-proof as well as insect-proof and mildew-proof. Moreover, according to this flooring method, a three-layered floor plane mainly consists of a cork member which is light in weight and has a superior sound shielding, which enables to reduce the building material amount such as concrete and reinforcing steel, which in turn significantly reduces building costs and term of construction as well as enables to build a multiple dwelling house having a high ceiling and a superior sound shielding with effective cooling and warming because of the superior heat insulation of the floor material.

BRIEF DESCRIPTION OF THE DRAWINGS

FIGS. 5A and 5B show the results of experiment for measuring the floor hardness in case of fall down:

DETAILED DESCRIPTION OF THE PREFERRED EMBODIMENTS

Figure 1:
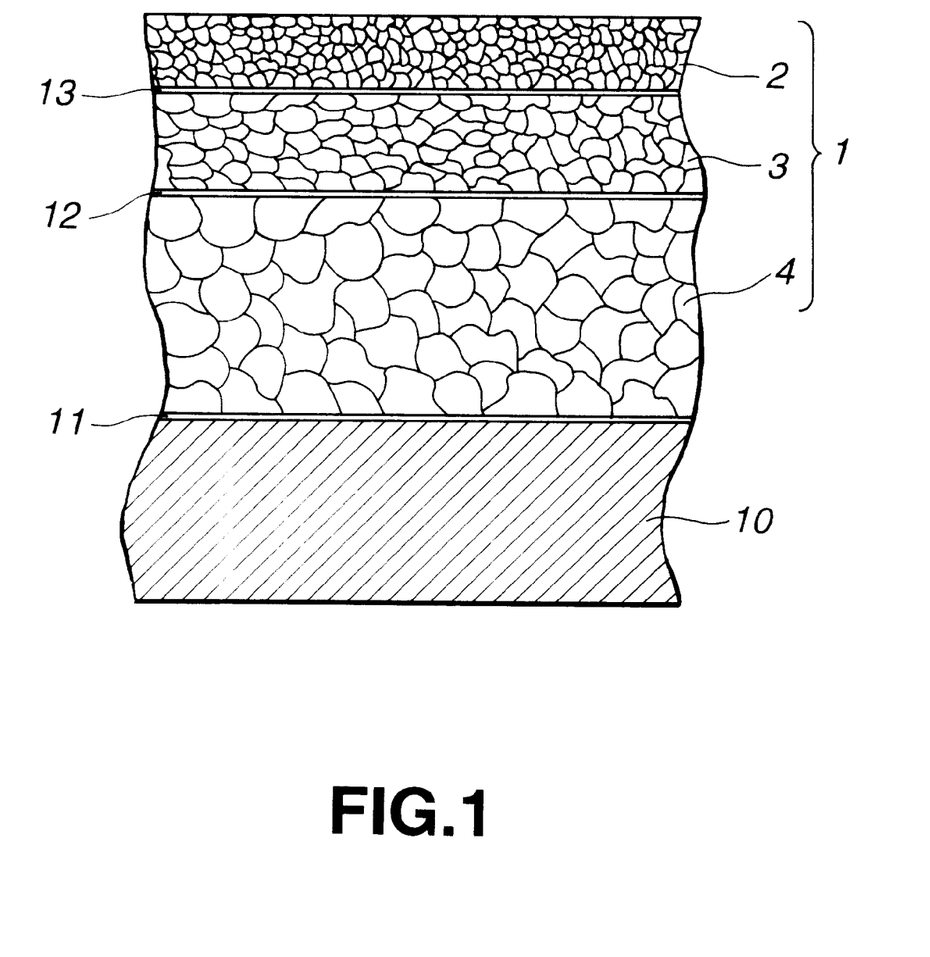
FIG. 1 is a cross sectional view of an essential portion of a flooring material according to an embodiment of the present invention applied on a concrete slab.
Figure 2:
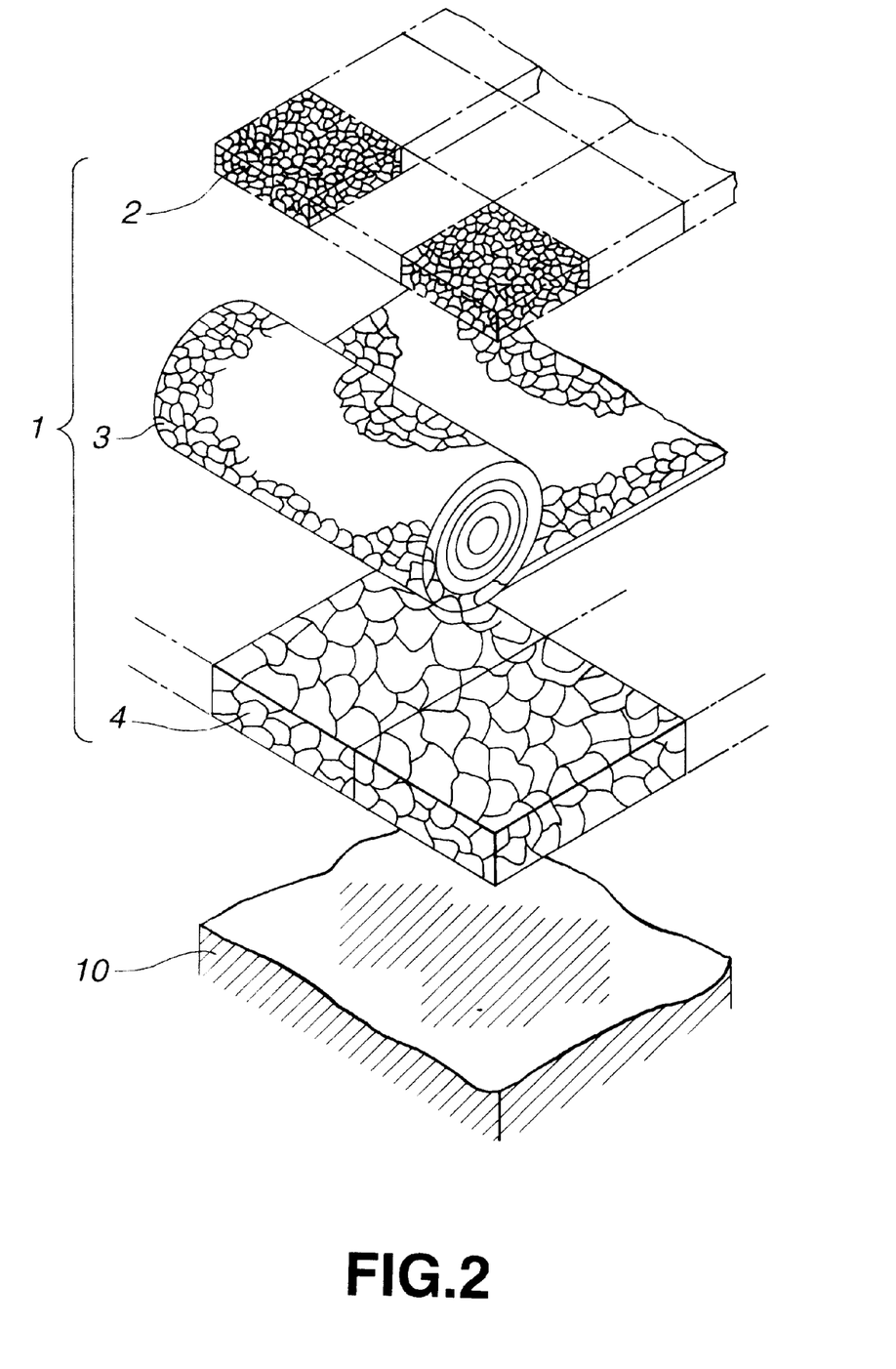
FIG. 2 is a perspective exploded view showing an essential portion for explanation of application of the aforementioned flooring material.

Description will now be directed to preferred embodiments of the present invention with reference to the attached drawings. As shown in FIG. 1 and FIG. 2, a floor material 1 consists of three different cork materials having different specifications, i.e., a surface cork member 2, an intermediate cork member 3, and a substrate cork member 4, which are successively layered, for example, on a concrete slab 10 by using a wood work adhesive or the like, thus obtaining a three-layered floor. The surface cork member 2 is a cork material formed into tiles. The intermediate cork member 3 is cork material formed into a sheet shape. The substrate cork member 4 is a cork material formed into a panel shape.

As is known, the cork is a botanical material consisting of dead small cells obtained from a cork tissue formed in a cork forming layer which is an external protection organ of a cork oak tree. The cork cells are arranged in square or octagonal shape and connected to one another so as to form a polyhedron having 14 faces in general, thus showing an external view of honeycomb structure. The cork cells have a size of approximately 30,000,000 cells/$cm^3$ or 42,000,000 cells/$cm^3$, having internal spaces filled with a gas almost identical to the air (but having no carbon dioxide). About 90% of the cork tissue is a gas. Each of the cells have five layers: two layers consisting of cellulose, two layers consisting of suberin and wax, and one layer consisting of cellulose.

The cork has a composition as follows: 45% of suberin, 27% of lignin, 12% of cellulose and polysaccharide, 6% of tannin, 5% of wax, and 5% of ash and other compounds. Because of the characteristics of suberin content, the cork has superior heat insulation and sound shielding and absorption as well as a high corrosion resistance. The lignin content which strengthen the tissue serves to obtain a mechanical strength of the cork. The cellulose content which is difficult to be dissolved serves to obtain a high chemical resistance of the cork. The tannin content which is firmly connected with protein serves to obtain a high insect and mildew resistance of the cork.

From the aforementioned tissue structure and the contents, the cork has the following preferable characteristics.

a. Light in weight, sufficient elasticity, and preferable restoring ability b. High non-permeability of liquid and gas c. Small conductivity for heat, sound, vibration, and the like d. The surface honeycomb structure increases the friction coefficient, which brings about a high abrasion resistance, e. Others (the cork does not absorb dusts; no tissue change occurs; high fire resistance)

Figure 3:
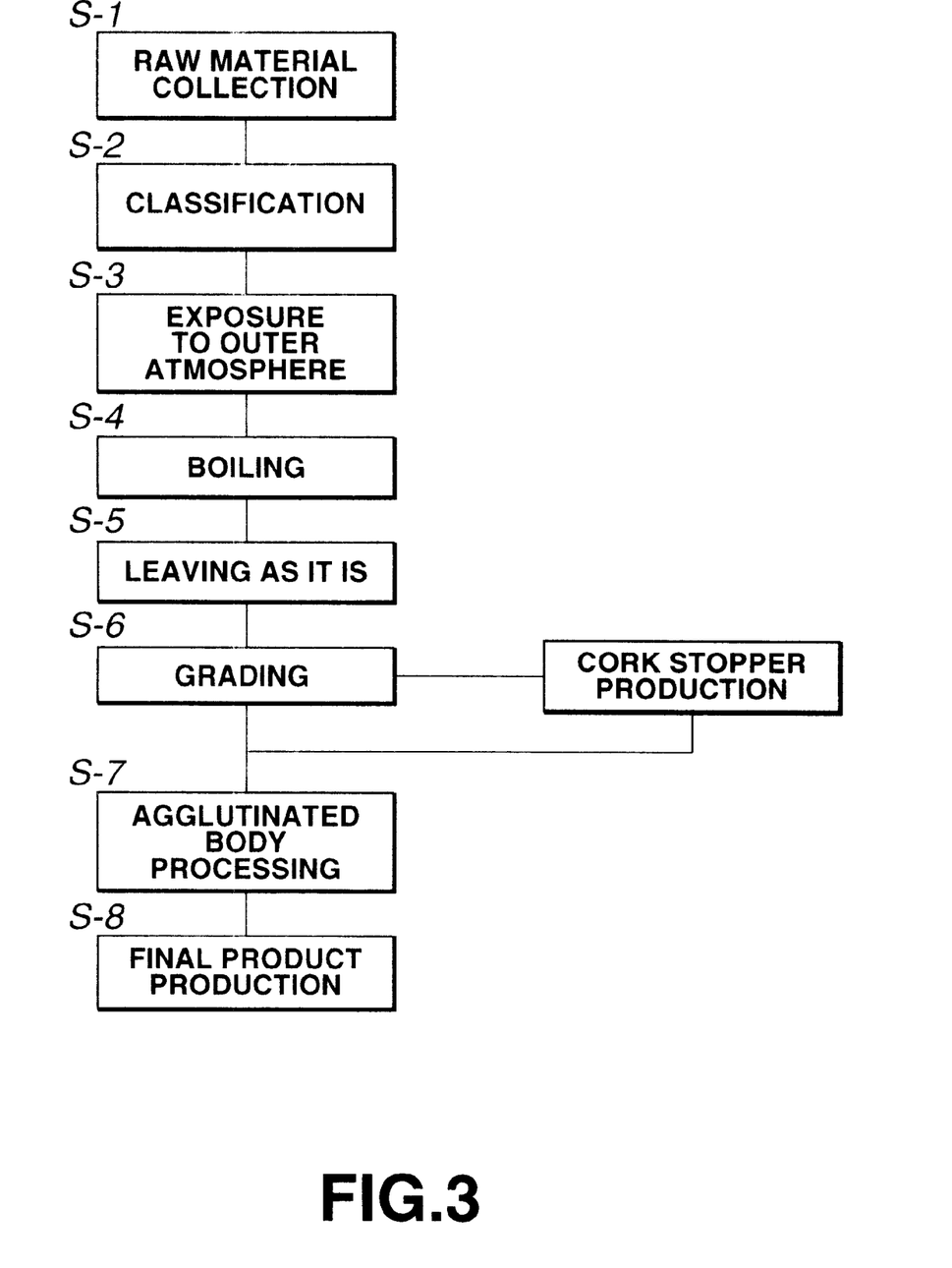
FIG. 3 explains production steps for obtaining the cork material used in the flooring material.

The aforementioned cork is produced as a cork material from a cork oak tree by the steps shown in FIG. 3, and this cork material is used to produce various cork products. The cork material producing starts with a first step (S-1) where bark is collected from a cork oak tree for preparing a raw cork material. The collected bark (cork) is subjected to a classification step (S-2) and left in the outdoor atmosphere for about 6 months (S-3) so that substitution of chemical components is promoted by the affects from the sun light, rain, wind, or the like, which increases the cork quality. The cork is then subjected to a boiling step (S-4) where the cork is heated in a boiling water for 75 minutes so as to eliminate animal flora and dusts as well as to obtain an elasticity.

The cork is again kept in the outdoor atmosphere for about three weeks (S-5), so as to obtain. a smooth cell structure, which facilitates a further processing. The cork is then subjected a grade classification step (S-6) for classification according to the quality. The cork which is selected as the best grade in this step is normally used for a cork stopper of a wine bottle, and the other grades of cork are used for further processing. When a cork stopper is produced, the cut pieces obtained are also utilized for further processing. The cork which has been classified for further processing is subjected to an agglutination step (S-7) where the cork is cut into small pieces or made into granular forms so as to obtain an agglutinated cork body. This agglutinated cork body is processed in various ways (S-8) according to final products to be obtained.

It should be noted that in the aforementioned agglutination step, the cork is cut into pieces or made into a granular form depending whether the cork is used with other elements such as rubber and cement. The granular forms are obtained as follows. The cork is saponificated in a heated caustic soda solution and soured with sulfuric acid so as to discharge fatty acid and soda compounds. The cork is further processed with a solvent such as trichroloethylene, alcohol, or the like so that fatty acid is isolated from the ligneous tissue, so as to obtain a granular form.

The floor material 1 is made from a cork member molded by using the bark portion which cannot be used as a cork stopper and cut pieces produced when a cork stopper is prepared. More specifically, the surface cork member 2 is prepared as follows. A bark cork is crushed into a granular form, which is added with a small amount of synthetic resin. The obtained mixture is introduced into a mold and pressed while heated so as to obtain an agglutinated cork body in a block form, which is sliced into cork tiles of a predetermined thickness.

The cork tiles obtained by slicing are further subjected to a surface processing such as wax processing, application of varnish, vinyl coating, or the like. Various types of cork tiles can be obtained by changing the type of synthetic resin to be mixed and pressure and temperature conditions for molding, so as to adjust the density. It is also possible to change the thickness in the slicing step. Moreover, it is possible to print various designs on the tile surface by way of silk screen printing, for example.

The cork tile has been conventionally used in various fields including building materials such as a wall material, ceiling material, and flooring material. The cork tile can increase the abrasion resistance by molding into a high density, which enables application as a flooring material not only in individual houses but also in public facilities such as a school, hospital, office, restaurant, and the like. Moreover, the cork tile has an excellent humid resistance and smooth surface, which enables application not only as a flooring material in a living room but also in a kitchen and bathroom including a toilette where water piping is provided.

The aforementioned cork tiles are used as the surface cork member 2. Because the surface cork member 2 constitutes a floor surface, it should have a high density and sufficient hardness, so that scars cannot be caused easily to the surface, caster running is smooth, and a long service life can be obtained. More specifically, the surface cork member 2 employs a cork tile of specification with a thickness of 5 mm after finished with varnish and a density of 500 Kg/m$^3$. The surface cork member 2 employing the cork tile enables to obtain a preferable finish of the flooring including the design aspect.

The present is not to be limited to the cork tile of the aforementioned specification. However, the surface cork member 2 uses a cork member having a higher density than the intermediate cork member 3 and the substrate cork member 4 which will be detailed later. Moreover, as the surface cork member 2 requires an accurate finish of flooring, it is preferable to use a tile-formed cork which enables to select various external views as well as facilitate accurate treatment including corner portions. However, the surface cork member 2 may be other than tile-formed cork materials such as panel-type tiles materials having larger outer dimensions.

The intermediate cork member 3 is a sheet-shaped cork material which has a density slightly smaller than that of the aforementioned surface cork member 2 and is rolled when supplied. The intermediate cork member 3 is a cork material having a specification between the surface cork member 2 and the substrate cork member 4. The intermediate cork member 3 is placed between the hard surface cork member 2 and the soft substrate cork member 4 for making an adjustment between their functions. The cork material constituting the intermediate cork member 3 is, similarly as the cork tiles, made from an agglutinated cork material using the bark cork crushed into granules which are added with an appropriate amount of adhesive and are pressed into a sheet shape, which is rolled.

The intermediate cork member 3 is made from cork granules having a slightly larger size and formed into a slightly lower density than the surface cork member 2. Consequently, the intermediate cork 3 has a slightly larger elasticity. More specifically, the intermediate cork member 3 is a sheet-shaped cork material having a thickness of 5 mm when finished with a sand paper and a density of 180 kg/m$^3$ to 500 kg/m$^3$. The intermediate cork member 3 has a surface finished with a sand paper with a slightly higher accuracy because its surface is to be bonded to the surface cork member 2.

The present invention is not to be limited to the intermediate cork member 3 of the aforementioned specification, but it should be a cork material having a lower density and a higher elasticity than the surface cork member 2. Moreover, the intermediate cork member 3 may be a panel-shaped member instead of a sheet-shaped member and its thickness may be varied according to the purpose. Furthermore, the intermediate cork member 3 may be a rubber-cork sheet which is made by impregnating a cork material in a rubber resin. The intermediate cork member 3 using such a rubber-cork sheet can increase waterproof, humidity proof or insulation of the floor surface.

The substrate cork member 4 is a carbonized cork material formed into a panel shape having a smaller density than the intermediate cork member 3. The carbonized cork material is prepared as follows. Cork which has been crushed into granules are mixed with power-state cork, and the mixture is heated to obtain a carbonized cork material. In this case, the granules have a slightly larger size than the granules used for forming the intermediate cork member 3. The granular cork extends its granular configuration when the powder state cork is burnt and a resin generated from the cork itself also promotes to connect the granules to one another, thus producing a solid intermediate body.

The solid intermediate body is cooled by a cooling water jet supplied from a nozzle of a cooling water jet apparatus and is also subjected to a pressurizing process for applying an appropriate pressure so as to obtain a predetermined density. The solid intermediate body thus generated in a block state is sliced into panels having an appropriate thickness. The carbonized cork material consists of granules having a large size and has a sufficient elasticity and thermal insulation characteristic.

More specifically, the substrate cork member 4 is a panel-shaped carbonized cork material having a thickness of 30 mm and a density of 210 kg/m$^3$ or below. As the substrate cork member 4 is a member constituting a bottom layer, there is no need of forming the surface with a high accuracy and no surface processing is carried out when the intermediate body is sliced into panels. For example, when the floor material 1 is applied in an individual house or a multiple dwelling house, the substrate cork member 4 employs a carbonized cork material having a comparatively low density such as 180 kg/m$^3$ to 200 kg/m$^3$. Moreover, in a case when the floor material 1 is applied in a public facility where a lot of people come with their shoes on, it is necessary to use a carbonized cork material having a higher density. Note that the substrate cork member 4 may have various thickness values according to its purpose.

Figure 4:
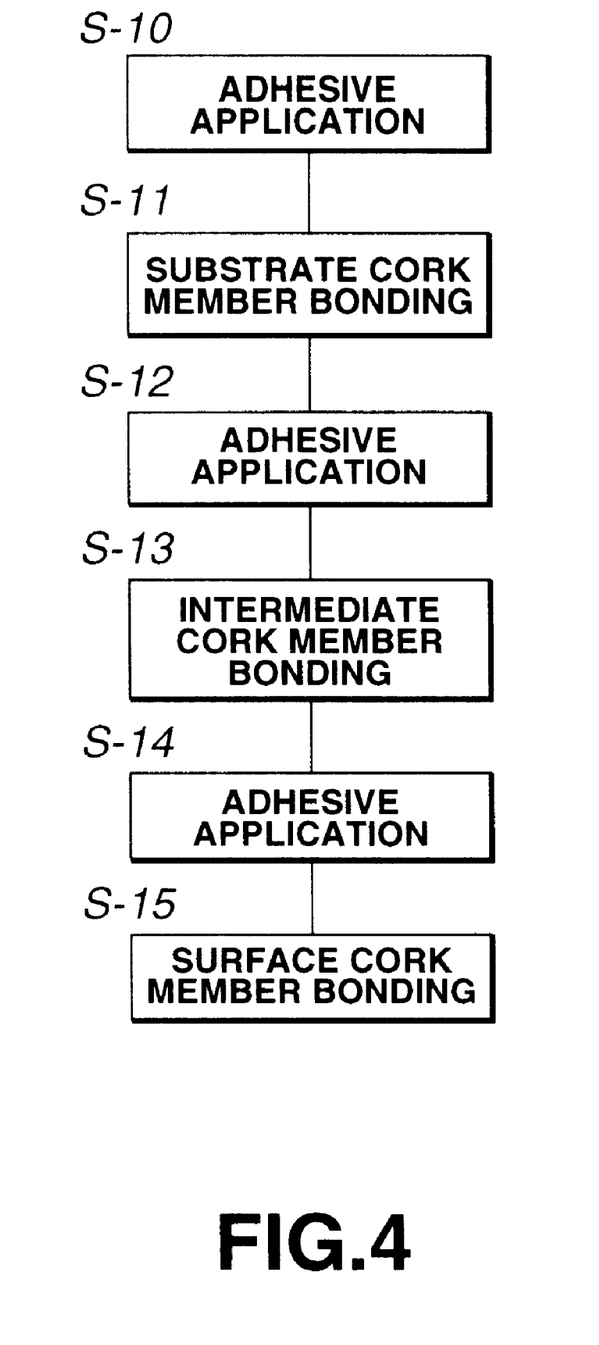
FIG. 4 explains an application procedure for applying the flooring material.

The aforementioned floor material 1 consisting of the surface cork member 2, the intermediate cork member 3, and the substrate cork member 4 is applied on a bed material such as the concrete slab 10 by way of a so-called dry process shown in FIG. 2 and FIG. 4. That is, in the first step S-10, an adhesive 11 is applied onto the concrete slab 10. The adhesive may be an ordinary wood work adhesive available on market, not requiring an organic solvent. The adhesive is applied onto the concrete slab 10 with a brush or the like. Consequently, the application of the adhesive does not require any special technique. Since no organic solvent is used, the working environment is preferable, and the time required for drying is significantly short.

In the second step S-11, the substrate cork member 4 is placed one after another on the concrete slab 10. The substrate cork member 4, as has been described above, is in a panel shape, and an unnecessary portion such as in the corner or the portion corresponding to a pillar is cut away using a cutter knife and a ruler. This step can also be carried out easily without requiring any special technique. The substrate cork member 4 is pressed with a roller or the like so as to be flat over the entire surface and firmly bonded to the concrete slab 10.

In the third step S-12, an adhesive 12 is applied onto the substrate cork member 4. This adhesive 12 is an adhesive equivalent to the adhesive used for bonding the aforementioned substrate cork member 4. In the fourth step S-13, the intermediate cork member 3 is placed to cover and to be bonded to the substrate cork members 4. Since the intermediate cork member 3 is a rolled up sheet, it can be easily placed while unrolling the sheet on the substrate cork member 4 without requiring any special technique. An unnecessary portion of the intermediate cork member 3 such as in the corner or the portion corresponding to a pillar is cut of by using a cutter knife and a ruler. The intermediate cork member 3 stretched is pressed with a roller or the like so as to be flat over the entire surface and firmly bonded to the substrate cork member 4.

In the fifth step S-14, an adhesive 13 is applied onto the intermediate cork member 3. This adhesive 13 is an adhesive equivalent to the aforementioned adhesive used for bonding the substrate cork member 4 or the intermediate cork member 3. It is also possible to apply the adhesive 13 directly on the rear surface of the surface cork member 2. In the sixth step S-15, the surface cork member 2 is bonded one after another to the intermediate cork member 3. As the surface cork member application step is a step for bonding the surface cork members constituting the floor surface, it is necessary to take care to arrange the surface cork members so as to have a nice external view and not to leave a space between the surface cork members 2. However, any high special technique is required in this step. An unnecessary portion of the surface cork member such as in the corner and around a pillar is cut off by using a cutting knife and a ruler. The surface cork members 2 are pressed with a roller or the like so as to be flat over the entire surface and firmly bonded to the intermediate cork member 3.

It should be noted that the adhesives 11 to 13, as has been describe above, may be ordinary wood work adhesives available on market. However, it is also possible to apply a water-proof adhesive as the adhesive 12 for bonding the intermediate cork member 3 to the substrate cork member 4. The water-proof adhesive 12 can increase the waterproof and humidity proof or insulation of the floor surface. Moreover, the adhesives 11 to 13 may be selected from various adhesives having a strong adhesion strength according to the purpose.

With the aforementioned steps, the floor material 1 consisting of three types of cork materials having different specifications, i.e., the surface cork member 2, the intermediate cork member 3, and substrate cork member 4 constitutes a three-layered floor. Moreover, the floor material 1 can be applied, as has been described above, without requiring any high technique or any bulky apparatuses, enabling that a worker can finish 20 m² of flooring per day in a multiple dwelling house of an average specification. Furthermore, as the floor material 1 is light in weight in comparison to the ordinary flooring material, handling the materials including carrying the materials is made much easier. Still further, since the floor material 1 consists of three layers made from the same material, a single adhesive can be used for bonding between the layers and the bonding strength is significantly high.

For example, the aforementioned floor material 1 is compared to an ordinary flooring material when applied to a 14-storied multiple dwelling house of 55 apartments having a total floor area of 6000 m² built by way of the SRC method satisfying the conditions of LH (heavy weight shock sound shielding grade)=50 and LL (light weight shock sound shielding grade)=50. In the case of the ordinary flooring, it is necessary that the flooring have thickness of 12 mm and the concrete slab 10 have thickness of 180 mm. On the other hand, in the case of the floor material 1, the concrete slab 10 need to have a thickness of 150 mm. As for the total weight of the building, it is possible to reduce about 10% (850 tons) by using the floor material 1 in comparison to use of the ordinary flooring. That is, the floor material 1 reduces the thickness of the concrete slab 10, which in turn reduces the total weight of the reinforcing steel, bolts, frames, and the like.

Consequently, the floor material 1 enables to significantly reduce the material costs, the number of building steps, and the construction period when the building specification is identical. Moreover, the floor material 1 enables to increase the height of the ceiling, which improves the feeling of a dweller together with the preferable surface view.

As has been described above, the floor material 1 is required to have various superior functions such as in safety in case of fall down, sound shielding/absorption, easiness of walking and caster-running, restoring ability, prevention of fire spreading, heat insulation characteristic, water-proof and chemicals-proof characteristics as well as insect-proof and mildew proof characteristics. For the conventional flooring materials including tatami and carpets, these functions are evaluated as has been shown in Table 1. Evaluation of the floor material 1 will be given below in accordance with Table 1. As is clear from Table 1, the floor material 1 has superior characteristics in safety in case of fall down, fire spread prevention, heat insulation, and other aspects.

For carrying out a test of the floor material 1, there was prepared a test piece having the aforementioned specifications, i.e., a three-layered test piece consisting of a first layer which is a cork tile having a surface finished with wax and having a thickness of 5 mm and density of 500 kg/m³; a second layer which is a cork sheet having a surface finished with a sand paper and having a thickness of 5 mm and density of 210 kg/m³; and a third layer which is a carbonated cork having a thickness of 30 mm and density of 180 kg/m³. This test piece was subjected to the following test of the representative function characteristics and the results were evaluated in comparison to a flooring piece having a thickness of 12 mm.

[1] Floor Hardness in Case of Fall Down (JIS A 6519)

Figure 5A:
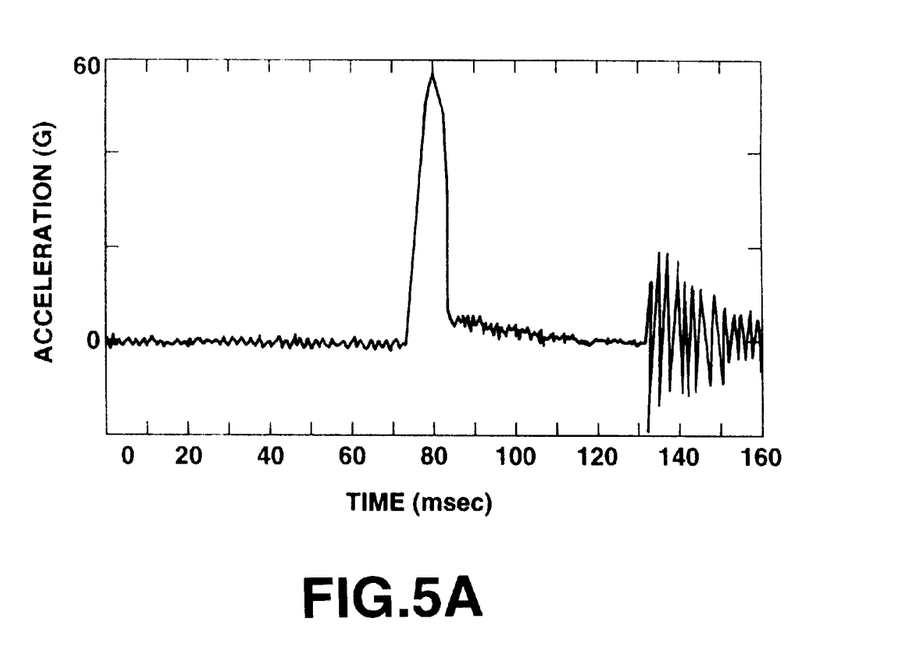
FIG. 5A shows the results of experiment of the test piece.
Figure 5B:
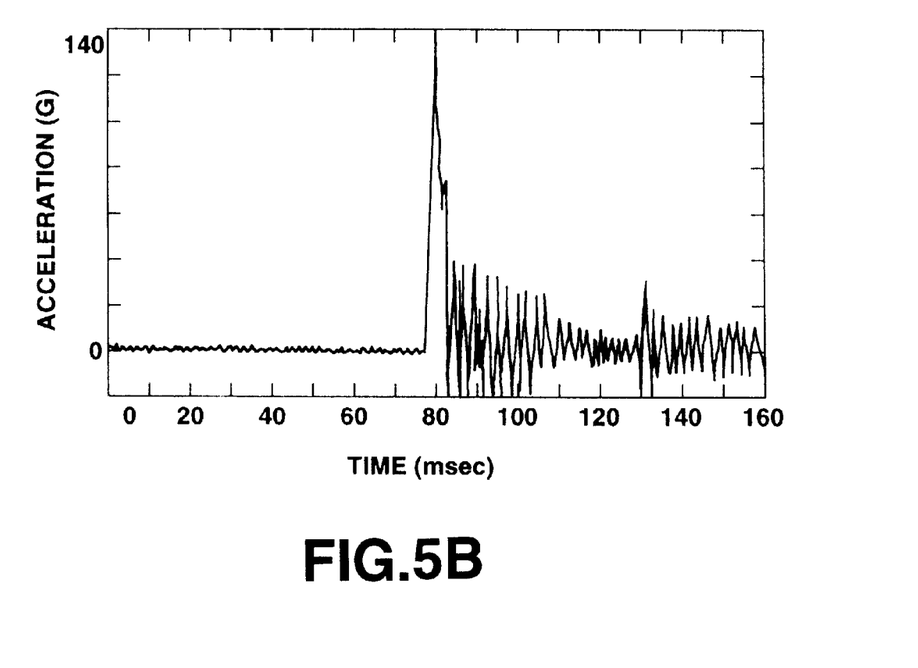
FIG. 5B shows the results of experiment of the conventional flooring material.

The floor hardness in case of fall down is measured as follows. A human head model containing an accelero meter is subjected to a free-fall drop from a predetermined height onto a surface of an object to be measured, and the maximum acceleration generated in the built-in accelero meter is used to evaluate the floor hardness. The maximum acceleration is preferably 100 G or below for the purpose of safety. FIG. 5 shows the acceleration test results measured by the aforementioned apparatus for the test piece and the comparative example. In FIG. 5, the vertical axis represents acceleration (G) and the horizontal axis represents time (msec).

As is clear from FIG. 5A, the test piece showed the maximum acceleration 56.49 G which is sufficiently safe in the case of fall down. As is clear from FIG. 5B, the comparative example showed the maximum acceleration of 131.22 G and has a problem in safety in the case of fall down.

[2] Sliding Test

There is still no established evaluation method for the sliding characteristics when walking on the floor. Here, the sliding resistance of the test piece and the comparative example were measured using felt slippers, cotton socks, and vinyl slippers as the sliding pieces. Each of the sliding pieces is attached to a bottom of a shoe, a load weight of 80 kg is applied vertically to the floor, and the shoe was drawn so as to determine the maximum tensile load, which was divided by the load weight to obtain a value (C.S.R) which is used as a sliding resistance evaluation index. As the optimal sliding value (C.S.R) decreases, it becomes easier to slide, and this value can be employed as an index for waking comfortability and safety and safety when changing the direction.

Assuming a normal walk with slippers on, the optimal (the most comfortable) slide value (C.S.R) is 0.4 (C.S.R) ±α, and the allowance is 0.3 to 0.58 (C.S.R). If safety is considered, the optimal slide value is 0.42 (C.S.R) ±α and the allowance is 0.3 to 0.62 (C.S.R). Moreover, when assuming a normal walk with socks on, the optimal (the most comfortable) slide value is in the order of 0.35 (C.S.R) ±α and the allowance is 0.28 to 0.45 (C.S.R). When safety is considered, the optimal value is 0.38 (C.S.R) ±α and the allowance is 0.3 to 0.48 (C.S.R).

When assuming a change of walking direction with slippers on, the optimal slide value (the most comfortable value) is 0.4 (C.S.R) ±α, and the allowance is 0.28 to 0.65 (C.S.R). When safety is considered on change of the walking direction with slippers on, the optimal value is 0.37 (C.S.R) ±α and the allowance is 0.28 to 0.48 (C.S.R).

The test piece showed 0.381 (C.S.R) for the felt slipper, 0.339 (C.S.R) for the cotton socks, and 0.461 (C.S.R) for the vinyl slippers. Thus, the test piece falls in the allowance range near the optimal values during a normal walk and a change of walking direction, both in the comfort and safely. On the other hand, the comparative example showed 0.303 (C.S.R) for the felt slippers, 0.289 (C.S.R) for the cotton socks, and 0.401 (C.S.R) for the vinyl slippers. Thus, the comparative example has a problem in safety, especially when walking with socks on.

[3] Caster Running

The caster running was evaluated by measuring a tensile load required for drawing a reference caster on the object to be tested with a speed of 10 cm/s. The smaller the tensile load, the better is the caster running. The reference caster used is a four-wheeled caster having a total weight of 45.0 kg. Each of the wheels has a radius of 37.5 mm and a width of 26.0 mm and is made from nylon having the Shoa A hardness of 99. The wheels are arranged at 535 mm in the running direction and at 520 mm at the width direction.

The test piece showed the tensile load of 3.46 kg·f, whereas the comparative example showed the tensile load of 1.71 kg·f. Consequently, it can be said that the floor material 1 is inferior to the comparative example in the aspect of caster running. However, if compared to tatami and carpets, it is possible to move on the test piece a wheel-chair and a castered bed without any trouble.

[4] Sound Shielding and Absorption

For carrying out a test of the sound shielding and absorption, there was prepared a three-layered test board of 2500 mm (length)×4000 mm (width) consisting of: a first layer which is a cork tile having a surface finished with wax and having a thickness of 5 mm and density of 500 kg/m$^3$; a second layer which is a cork sheet having a surface finished with a sand paper and having a thickness of 5 mm and density of 210 kg/m$^3$; and a third layer which is a carbonated cork having a thickness of 35 mm and density of 170 kg/m$^3$. The test board was placed on an RC slab of 4140 mm×2640 mm having a thickness of 150 mm.

A tapping machine was used as a light weight shock source and a bang machines was used as a heavy weight shock sound source. The floor shock sound level was measured by using a precision sound level meter having an octave band analyzer. A difference in the floor shock sound level was determined according to the JIS A1418 specification between the shock sound level applied directly on the RC slab board and the shock sound level via the test board placed on the RC slab board, as ΔL=LR−LC (wherein ΔL represents an improvement in the floor shock sound level; LR represents the floor shock sound level (dB) on the RC slab board; and LC, the shock sound level (dB) on the test board).

Figure 6A:
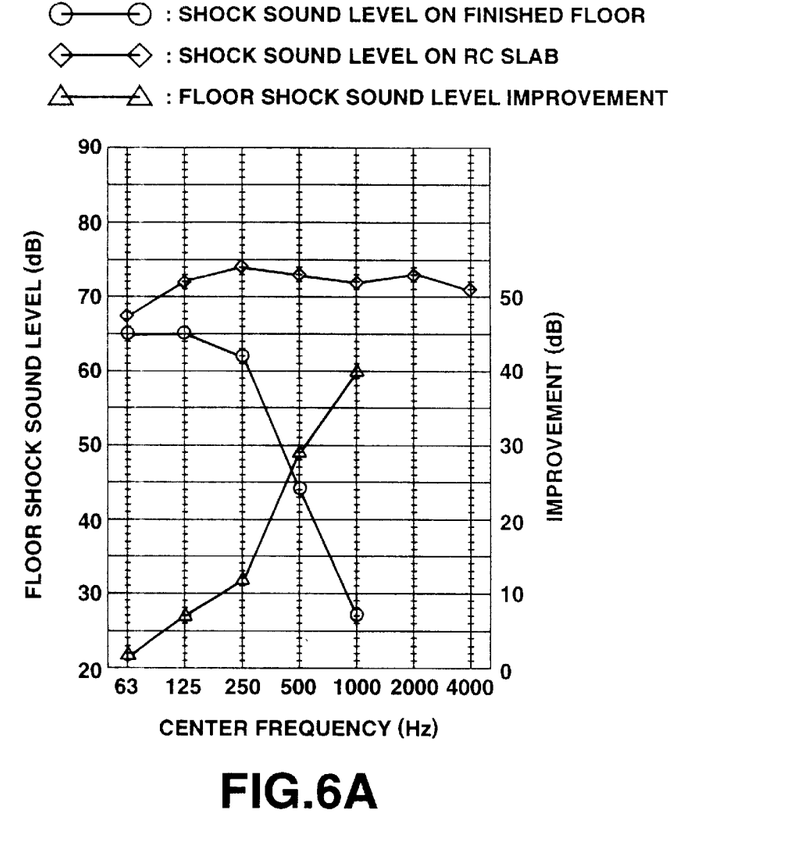
FIGS. 6A and 6B show the sound shielding and absorption characteristic of the aforementioned floor material through the floor shock sound level determined by using a light weight shock source.
Figure 6B:
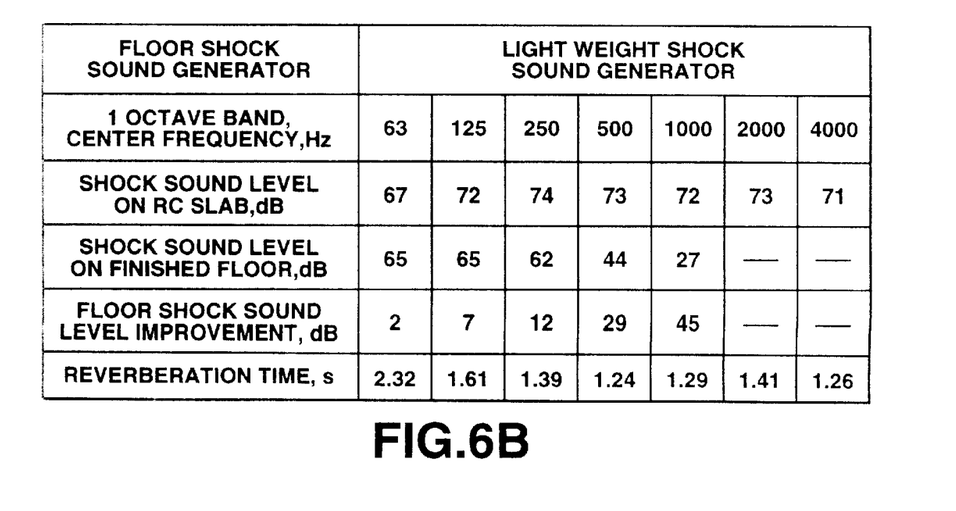

FIG. 6 shows results of measurements of the floor shock sound level when the light shock source was used. In FIG. 6A, the vertical axis represents a floor shock sound level (dB) and the horizontal axis represents a center frequency (Hz), plotting the floor shock sound levels on the RC slab board and on the test board as well as improvements according to the center frequency band. FIG. 6B is a table showing the data of FIG. 6A. The test board, i.e., the floor material 1 showed an improvement of 12 to 45 dB in the center frequency 250 to 1000 Hz.

Figure 7A:
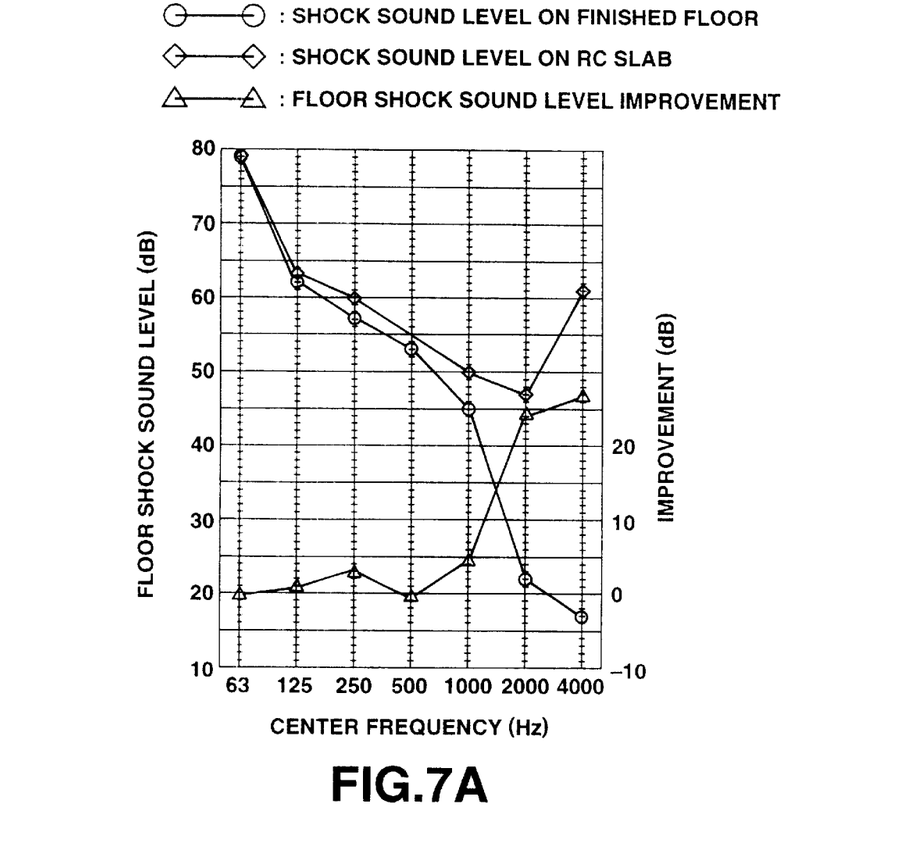
FIGS. 7A and 7B show the sound shielding and absorption characteristic of the aforementioned floor material through the floor shock sound level determined by using a heavy weight shock source.
Figure 7B:
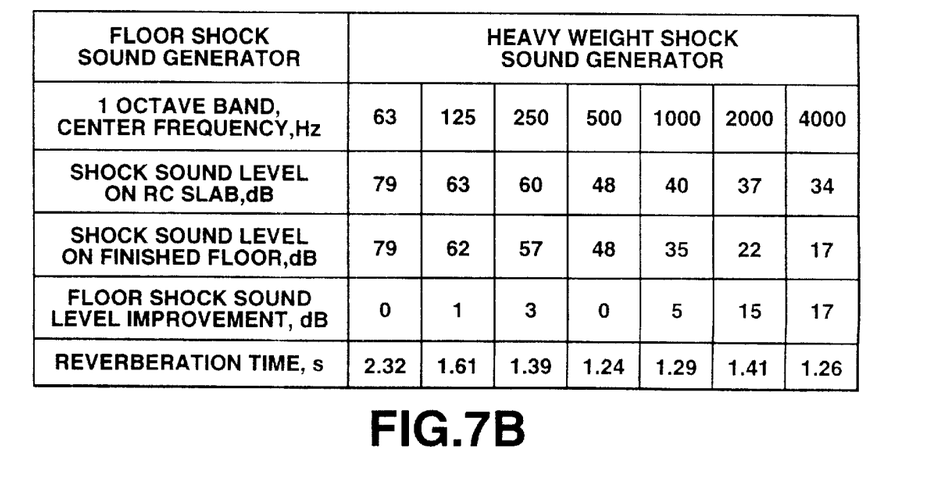

Similarly, FIG. 7 shows results of measurements of the floor shock sound level when the heavy weight shock source was used. In FIG. 7A, the vertical axis represents the floor shock sound level (dB) and the horizontal axis represents the center frequency (Hz), plotting the floor shock sound levels of the RC slab board and the test board as well as improvement amounts according to the center frequency band. FIG. 7B is a table showing the data of FIG. 7A. The floor material 1 showed a preferable of result exhibiting an improvement of 15 dB or above in the center frequency band of 2000 Hz.

Figure 8:
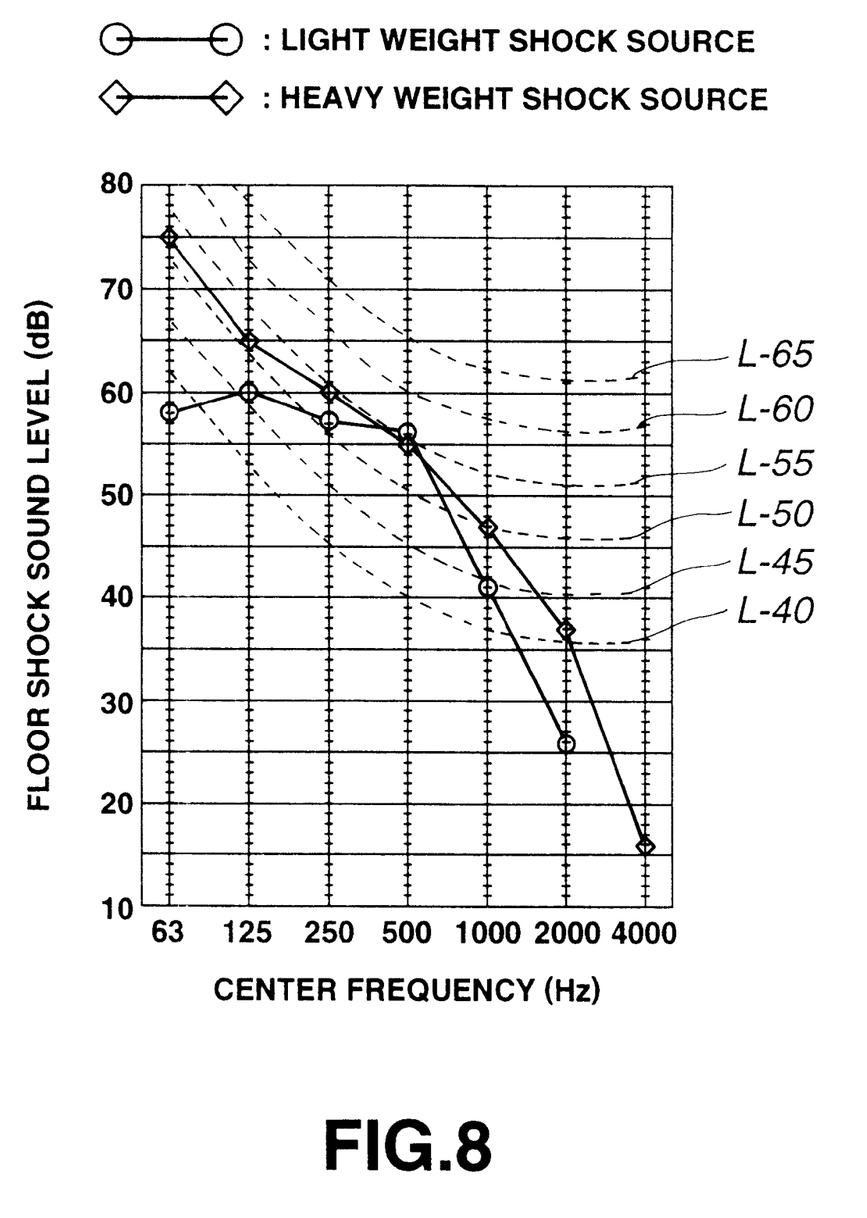
FIG. 8 shows sound shielding grades based on the calculations of the floor shock sound level using the light weight shock source and the heavy weight shock source.

As for the sound shielding grade, the aforementioned floor shock sound level improvement amounts were used to calculate the floor shock sound level when the floor is made from the test board, i.e., the floor material 1 is placed on a concrete slab having a thickness of 150 mm. This floor shock sound level calculated is referred to the grades specified in JIS A 1419. This floor shock sound level is calculated by L=LS−AC (wherein L represents the floor shock sound level calculated (dB); LS represents the concrete slab shock sound level calculated (dB); and AL, floor shock sound level improvement (dB)). In FIG. 8, the vertical axis represents the floor shock sound level calculated (dB) and the horizontal axis represents the center frequency (Hz), plotting the floor shock sound levels calculated for the light weight shock source and the heavy weight shock source according to the center frequency band. As is clear from FIG. 8, the floor material 1 satisfies the sound shielding grade L-50 both for the light weight shock source LL and the heavy weight shock source LH. In other words, the floor material 1 exhibits the sound shielding characteristic of the grade L-50 even when the concrete slab 10 has a thickness of 150 mm.

In the aforementioned embodiment, the floor material 1 was prepared at the cite by bonding by an adhesive the tile-shaped surface cork member 2, the sheet-shaped intermediate cork member 3, and the substrate cork member 4. However, the present invention is not limited to this. The floor material 1 may be such that the surface cork member 2 and the intermediate cork member are bonded to each other in advance and the layered material is bonded to the substrate cork member 4 made from carbonated cork.

Moreover, the surface cork member 2, the intermediate cork member 3, and the substrate cork member 4 may vary their thicknesses according to the specification of a house. For example, in a detached house, it is not necessary to obtain the sound shielding level of grade L-50 and the intermediate cork member 3 or the substrate cork member 4 may have a slightly smaller thickness. Moreover, when applied to a public facility where a lot of people come and go with their shoes on, it is recommended to use the substrate cork member 4 having a slightly larger thickness.

Furthermore, in the aforementioned embodiment, the floor material 1 is a three-layered material having the surface cork member 2, the intermediate cork member 3, and the substrate cork member 4. However, the present invention is not limited to this configuration. The surface cork member 2 constituting the floor material 1 may be a conventional surface member which satisfies the density of 500 kg/m$^3$ or above such as a laminated wood, a flooring material made from a laminated wood having a cushion material, a single board, linoleum, stone tiles, and the like.

As has thus far been described, the floor material according to the present invention has a three-layered configuration consisting of a substrate cork member to be placed directly on a concrete slab or the like, an intermediate cork member and a surface decorative member and exhibits superior characteristics required for a floor material: safety in case of fall down, walking easiness, caster running, sound shielding and absorption, heat insulation, water-proof, chemicals-proof, insect-proof, mildew-proof, and the like. Moreover, the floor material according to the present invention reduces the total amount of the building materials required such as concrete and reinforcing steel, which in turn significantly reduces the construction costs and period of time required as well as enables to obtain a high ceiling with a high sound shielding characteristic and an effective cooling and warming of a room.

Moreover, the flooring method according to the present invention is realized easily and in a short term, more specifically, by bonding a substrate cork member on a concrete slab or a floor basement of a building, which member is then covered by an intermediate cork member and a surface decorative member in this order, thus enabling to obtain a three-layered cork floor, which has superior floor characteristics: safety in case of fall down, walking easiness, caster running, sound shielding and absorption, heat insulation, water-proof, chemicals-proof, insect-proof, mildew-proof, and the like. Moreover, according to this flooring method, it is possible to significantly reduce the building material amount required such as concrete and reinforcing steel, which in turn greatly reduces the building costs and shortens the building term, as well as enables to obtain a high ceiling with a sufficient sound shielding and effective cooling and warming of a room.

What is claimed is:

1. Floor material comprising:

a surface cork member of a high density, constituting a floor surface layer, made from a dried bark of a cork oak tree crushed into granules and mixed with a synthetic resin, which is shaped into a block body by a mold and cut into a tile shape;

an intermediate cork member of a density slightly lower than that of said surface cork member, constituting a floor intermediate layer, made from a cork oak tree crushed into granules and mixed with an adhesive, and the obtained mixture is pressed into a sheet shape; and a substrate cork member of a density slightly lower than that of said intermediate cork member, constituting a floor substrate layer, made from a mixture of granular cork oak and a powered cork oak which is heated while being pressurized and formed into a block-shaped carbonated cork material which is cut into a panel shape;

wherein said substrate cork member is bonded to a backing material of a building, on which said intermediate cork member and said surface decorative member are successively bonded, so as to obtain a three-layered floor plane.

2. The floor material as claimed in claim 1, wherein said surface cork member comprises a tile-shaped cork member having a density of 500 kg/m$^3$; said intermediate cork member comprises a sheet-shaped cork member having a density in the range of 150 kg/m$^3$ to 500 kg/m$^3$; and said substrate cork member comprises a panel-shaped cork member having a density below 320 kg/m$^3$; and material for each member is selected in such a way that the density of the substrate cork member is lower than the density of the intermediate cork member.

3. The floor material as claimed in claim 1 wherein at least two of said surface cork member, said intermediate cork member and said substrate cork member are previously formed in a unitary layered board.

4. A flooring method for forming a three-layered floor plane comprising:

a substrate cork member bonding step for constituting a floor substrate layer by bonding onto a backing material of a building a substrate cork member made from a mixture of granular cork oak and a powered cork oak which is heated while being pressurized and formed into a block-shaped carbonated cork material which is cut into a panel shape;

an intermediate cork member bonding step for constituting an intermediate floor layer by bonding onto said substrate cork member an intermediate cork member of a density slightly higher than that of said substrate cork member made from a cork oak tree crashed into granules and mixed with an adhesive, and the obtained mixture is pressed into a sheet shape; and an surface cork member bonding step for constituting a floor surface layer by bonding on said intermediate cork member a surface cork member of a density slightly higher than that of said intermediate cork member made from a dried bark of a cork oak tree crushed into granules and mixed with a synthetic resin, which is shaped into a block body by a mold and cut into a tile shape.

5. The flooring method as claimed in claim 4 wherein said surface cork member comprises a tile-shaped cork member having a density of 500 kg/m$^3$; said intermediate cork member comprises a sheet-shaped cork member having a density in the range of 150 kg/m$^3$ to 500 kg/m$^3$; and said substrate cork member comprises a panel-shaped cork member having a density below 320 kg/m$^3$; and material for each member is selected in such a way that the density of the substrate cork member is lower than the density of the intermediate cork member.

6. The flooring method as claimed in claim 4, wherein said at least two of said surface cork member, said intermediate cork member and said substrate cork member are previously formed in a unitary layered board, and the unitary layered board is successively bonded to the other member and/or to said backing material of a building.

* * * * *